(12) United States Patent
Hasebe et al.

(10) Patent No.: US 12,277,407 B2
(45) Date of Patent: Apr. 15, 2025

(54) PROGRAMMING AIDING METHOD IN A VISUAL PROGRAMMING INTERFACE

(71) Applicant: Hitachi, Ltd., Tokyo (JP)

(72) Inventors: Tatsuya Hasebe, Tokyo (JP); Erika Katayama, Tokyo (JP); Makoto Onodera, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 146 days.

(21) Appl. No.: 18/125,263

(22) Filed: Mar. 23, 2023

(65) Prior Publication Data

US 2023/0350647 A1 Nov. 2, 2023

(30) Foreign Application Priority Data

Apr. 27, 2022 (JP) .................................. 2022-072965

(51) Int. Cl.
*G06F 8/34* (2018.01)
*G06F 8/60* (2018.01)
*G06F 8/77* (2018.01)

(52) U.S. Cl.
CPC ...................................... *G06F 8/34* (2013.01)

(58) Field of Classification Search
CPC ....................................................... G06F 8/34
See application file for complete search history.

(56) References Cited

U.S. PATENT DOCUMENTS

| | | | | |
|---|---|---|---|---|
| 2017/0316114 A1* | 11/2017 | Bourhani | ................ | G06F 30/00 |
| 2018/0357152 A1* | 12/2018 | Browne | .............. | G06F 11/3664 |
| 2020/0264847 A1* | 8/2020 | Nasu | ......................... | G06F 8/34 |
| 2021/0373857 A1* | 12/2021 | Man | ......................... | G06N 5/01 |

FOREIGN PATENT DOCUMENTS

JP 2019-24935 A 2/2019

OTHER PUBLICATIONS

Feng Xia et al., Graph Learning: A Survey, 2021 IEEE, [Retrieved on Dec. 26, 2024]. Retrieved from the internet: <URL: https://ieeexplore.ieee.org/stamp/stamp.jsp?tp=&arnumber=9416834> 19 Pages (109-127) (Year: 2021).*

* cited by examiner

*Primary Examiner* — Anibal Rivera
(74) *Attorney, Agent, or Firm* — Crowell & Moring LLP (57) ABSTRACT

A programming aiding apparatus that includes a visual program storage unit performs a programming aiding method. In the apparatus, a training data generating unit edits the visual program. A graph learning unit trains a graph learning model that receives a feature of a node and a connection of the node in the visual program as an input, among the input data, and outputs a likelihood of a feature of a node to be added to in the visual program. An added node selecting unit calculates a likelihood of a feature of a node by using data of a visual program as input data input to the learning model trained by the graph learning unit, and selects a node to be added based on the likelihood.

10 Claims, 9 Drawing Sheets

PROGRAMMING AIDING METHOD IN A VISUAL PROGRAMMING INTERFACE

CLAIM OF PRIORITY

The present application claims priority from Japanese Patent application serial no. 2022-072965, filed on Apr. 27, 2022, the content of which is hereby incorporated by reference into this application.

BACKGROUND OF THE INVENTION

1. Field of the Invention

The present invention relates to a programming aiding apparatus and a programming aiding method that uses a visual programming interface.

2. Description of the Related Art

As techniques for implementing a computer program or modelling logic without using descriptions of a source code, techniques referred under names such as visual programming, visual scripting, and procedure modeling (hereinafter, referred to as "visual programming") have been available. In visual programming, a directed graph is used to describe a process of a computer program. In a directed graph, a process or a variable is represented as a node, and an edge is used to connect nodes to express the sequence of the processes or make a reference to a variable.

An application developer (hereinafter, referred to as a "user") defines a process by adding a node corresponding to a process to be executed, designating a property for designating a process to a node, and connecting added nodes with an edge. By adopting visual programming, a user can develop an application without the skill of scripting with a source code.

Generally, in the application development, a computer program prepared in advance is used as a template, and only a necessary part is changed to shorten the development time. Similarly, in visual programming, at the time of program development, a user selects and reads a template of a visual program including a desired computer program, and makes additions and corrections to the template. In this manner, the user can save the time and effort for building the visual program corresponding to a portion predefined in the template, so that the efficiency of the application development can be improved.

As described above, with visual programming using a template, it is possible to omit tasks such as selecting a node to add, and defining an edge connecting nodes. Therefore, an improvement in the application development efficiency is achieved.

The technology disclosed in Japanese Patent Application No. 2019-24935 aids a visual programming development using a template, when the computer program under the development includes a process communicating with an external service, for example, through interoperation with a deployment manager that deploys the external service, so that the external service is automatically deployed as the template is downloaded, and end point information, such as an address of the external service, is automatically set to the node that calls the external service. In this manner, burdens of a developer are reduced.

SUMMARY OF THE INVENTION

However, in order to aid visual programming using a template as disclosed in Japanese Patent Application No. 2019-24935, management and maintenance of a template are required, e.g., by manually defining and registering computer programs that are frequently used. Hence, there are burdens of designing and registering the templates appropriately. There are also many considerations to be given in relation to use of a template, such as searching for an appropriate template, combining a plurality of templates, or adopting only a part of the template.

Although Japanese Patent Application No. 2019-24935 gives a consideration to the effective use of templates, no considerations are given to how the template registration and management can be simplified. Therefore, the technique according to Japanese Patent Application No. 2019-24935 has a drawback that, as the number of templates increases, burdens of defining, managing, and using the templates also increase.

In consideration of the above, an object of the present invention is to improve the efficiency of application development without the burdens of manual definitions and management of templates.

In order to solve the above problems, a programming aiding apparatus according to the present invention is a programming aiding apparatus including: a visual program storage unit that stores therein a visual program created in past; a training data generating unit that edits the visual program stored in the visual program storage unit to generate training data including a pair of input data that is input to a learning model and target data, the input data including information of a directed graph of the visual program, and the target data including the node features serving as ground truth for training; a graph learning unit that trains a graph learning model that receives a feature of a node and a connection of the node in the visual program as an input, among the input data, and outputs a likelihood of a feature of a node to be added to in the visual program; and an added node selecting unit that calculates a likelihood of a feature of a node by using data of a visual program as input data input to the learning model trained by the graph learning unit, and selects a node to be added based on the likelihood.

With the programming aiding apparatus and the programming aiding method according to the present invention, the efficiency of application development can be improved, without the burden of manual definitions and management of the template.

DESCRIPTION OF THE PREFERRED EMBODIMENTS

A programming aiding apparatus according to the present invention is statistically trained with patterns of nodes and edges that frequently appear in visual programs, instead of manually defining and managing a template, to generate a pattern of a frequently used visual program as a statistical model, which has been conventionally prepared as a template. Furthermore, the programming aiding apparatus according to the present invention collects existing visual programs and builds a database thereof to accumulate a relationship between a visual program having been already created and nodes and edge to be added; is statistically trained with a graph structure of a visual program currently being created and a relationship between the nodes and the edge to be added; and presents the nodes and the edge that are to be added to the visual program currently being created to a user. Presenting the nodes and the edges so as to improve the efficiency of the visual programming using a template is made possible by statistically clarifying the underlying principle between the node to be added and the graph structure of the visual program currently being created, based on the existing patterns of nodes that are frequently used and of connections therebetween. A programming aiding apparatus 100 according to an embodiment of the present invention will now be explained with reference to the drawings.

Figure 1:
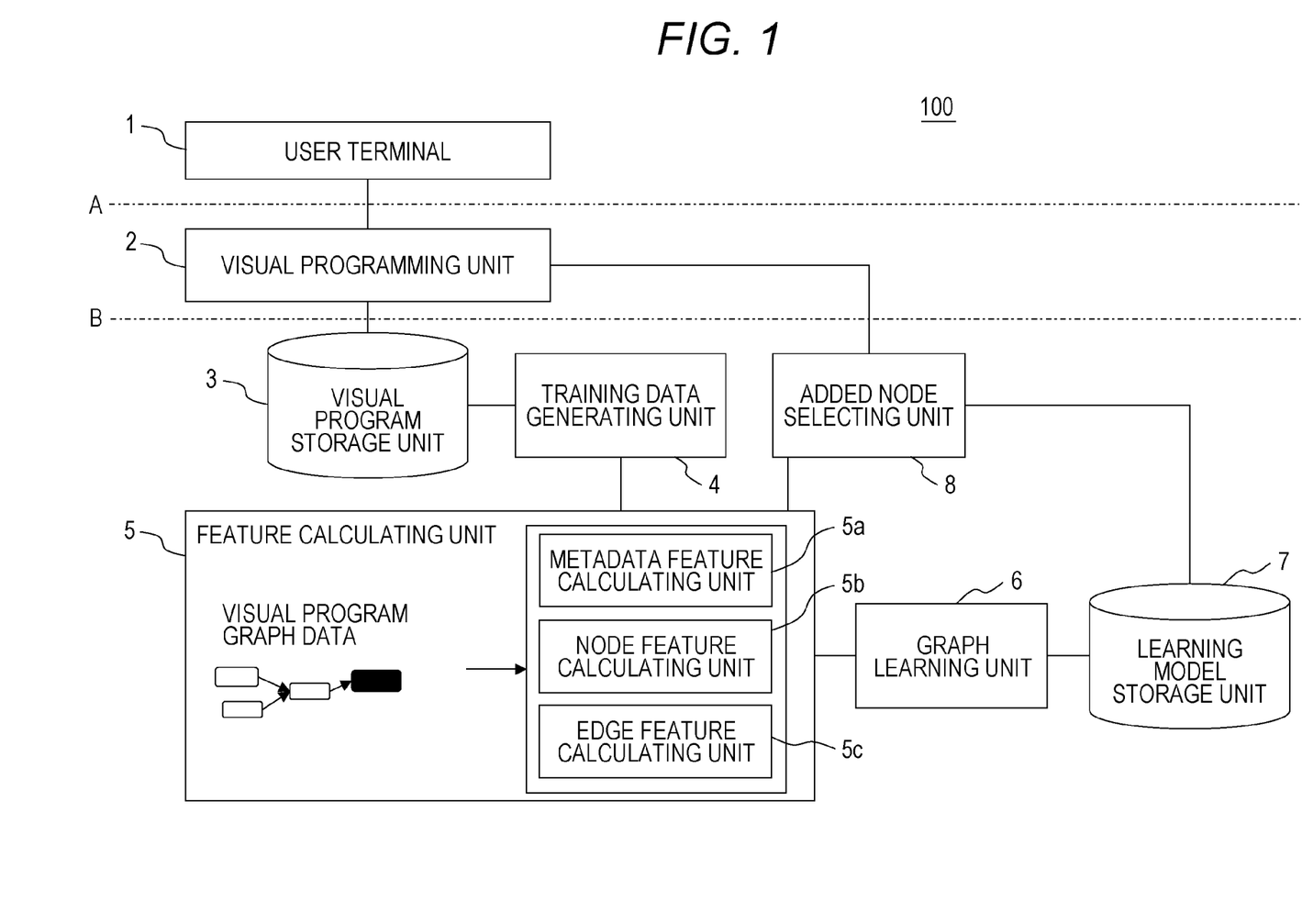
FIG. 1 is an illustration showing an example of a system configuration of a programming aiding apparatus according to an embodiment.

FIG. 1 is an example of a system configuration of the programming aiding apparatus 100 according to an embodiment of the present invention. This system collects and stores therein visual programs created on a user terminal 1. The system then is statistically trained with the relationships of what kind of visual program nodes are added to a visual program currently being created, and makes a recommendation of which visual program node is to be added, to a user who is developing the visual program.

Note that the programming aiding apparatus 100 according to the present embodiment is a computer including pieces of hardware such as a processor as a central processing unit (CPU) or a graphics processing unit (GPU), a main storage such as a semiconductor memory, an auxiliary storage such as a hard disk or a solid state drive (SSD), and a communication device. The processor (CPU or GPU) then implements functional units to be described later, by executing a desired program while referring to various databases. However, it is not always necessary to implement all of such functional units on a single computer. For example, the functional units above the alternate long and short dash line AA in FIG. 1 may be implemented by a computer directly used by a user, and the functional units below the line may be implemented on a cloud server. Alternatively, the functional units above the alternate long and short dash line BB in FIG. 1 may be implemented by a computer directly used by a user, and the functional units below the line may be implemented on a cloud server. The functional units shown in FIG. 1 will be now be explained one by one.

<User Terminal 1>

The user terminal 1 is a computer and a physical interface for allowing a user to operate a visual programming unit 2, which is to be described later. The physical interface includes a display device (such as a display) for displaying a visual program graphical user interface (GUI) generated by the visual programming unit 2, and an operation device (such as a mouse, a keyboard, or a touch panel) for allowing a user to operate the GUI generated by the visual programming unit 2. The user creates a visual program by making operations on the GUI generated by the visual programming unit 2 via the display device and the operation device on the user terminal 1.

<Visual Programming Unit 2>

The visual programming unit 2 is a functional unit used by a user creating a visual program, and has functions of presenting a GUI for visual program to the user, of creating and updating data for the visual program, and of updating GUI screen in accordance with user's operations performed on the user terminal. In addition, to create and to update the data of a visual program, the visual programming unit 2 has a function of adding, changing, or deleting a node N or an edge E to or from the visual program; a function of receiving inputs of metadata $D_M$ including the name of the visual program and tag information including a plurality of keyword character strings; a function of storing information of the created visual program in a storage device including a memory, a hard disk, an SSD, and an object storage on a network; and a function of acquiring data including definition information such as the name, the type such as a function or a variable, the name of an input or output property, and the value of an input or output property of a node N or an edge E that can be added with the visual program.

<Visual Program Storage Unit 3>

The visual program storage unit 3 is a functional unit that stores therein data of a visual program having been created by the visual programming unit 2, together with an identifier. The visual program storage unit 3 has a function of, in response to an instruction from an external program including the visual programming unit 2, storing data of the visual program specified in the instruction, outputting the visual program corresponding to the identifier requested by the instruction, and listing, selecting, and sorting the identifiers of the visual programs and information included in the data of the visual programs being stored.

<Training Data Generating Unit 4>

The training data generating unit 4 is a functional unit that acquires a plurality of visual programs stored in the visual program storage unit 3, and generates training data including pairs of ground truth and target data, using the acquired visual programs. The training data generating unit 4 is a functional unit that is executed upon request from an administrator, or regularly. The training data generated by the training data generating unit 4 includes explanatory variable data serving as input data to the learning model, and objective variable data paired with the explanatory variable and serving as target data in the training of the learning model.

The learning model herein is a learning model handled by the graph learning unit 6 and the learning model storage unit 7, which will be described later. The training data generating unit 4 creates a connected sub graph by omitting some of the nodes N and the edges E from the directed graphs of the acquired visual programs, and outputs information including the sub graph and the metadata $D_M$ of the visual programs as the explanatory variables, and information of the nodes N and edges E connected from the sub graph as a source, in the original directed graph, as objective variables. The explanatory variables mentioned above correspond to information of the visual program to which a node N or an edge E is to be added, and the objective variables mentioned above correspond to the information of the node N or the edge E actually added to the visual program.

<Feature Calculating Unit 5>

The feature calculating unit 5 is a functional unit that converts the visual program metadata $D_M$, and the information of the nodes N and the edges E in the directed graphs of the visual programs in the explanatory variable data or the objective variable data that are output from the training data generating unit 4 or the added node selecting unit 8, into a metadata feature $F_M$, a node feature $F_N$, and an edge feature $F_E$, respectively, all of which are represented as numeric vectors, so that the graph learning unit 6 can apply the information to the statistical learning model.

As to the directed graph data of the visual program, the node information and the edge information are converted into numeric vectors, and quantified as features. The information of connections between the directed graph nodes is retained in a manner associated with node features $F_N$ and edge features $F_E$, using a numerical expression including a dense or sparse adjacency matrix. The information of a node N or an edge E is quantified as a feature using information such as the type, the name, and the property of the node N, and the input label and the output label of the edge E.

<Graph Learning Unit 6>

The graph learning unit 6 is a functional unit that trains the learning model using the explanatory variables and the objective variables of the visual programs, the explanatory variables and the objective variables having been converted into the features by the feature calculating unit 5 described above. Note that the graph learning unit 6 is preferably implemented using a GPU that is a processor dedicated to image processing, rather than a CPU that is a general-purpose processor.

The learning model receives, as inputs, the metadata feature $F_M$, the node feature $F_N$, the edge feature $F_E$, and the directed graph connection information included in the feature-quantified explanatory variables of the visual programs, and outputs likelihoods of information including the node type, the node name, the property of the node N, and the edge type and the input and output labels of the edge E included in the objective variables. The learning model described above is also trained so as to predict and to identify the objective variables at higher performances, using the explanatory variable data and the objective variable data input to the graph learning unit 6. In other words, the learning model is trained in such a manner that the node N or the edge E to be added to the visual program that is the explanatory variable can be predicted from the information of the visual programs that is the objective variables.

As described in Background of the Invention section, visual programs include patterns (templates) of frequently used combinations of nodes N and edges E. Therefore, if a part of the visual program matches such a pattern, it is highly likely for the visual program to be followed by the node N or the edge E included in the pattern. Therefore, the information of the visual program currently being created is converted into a numeric vector as faithfully as possible by the feature calculating unit 5, and the learning model is trained through graph learning, using the problem of predicting the information of the nodes N and edges E actually added on the visual program currently being created. In this manner, the learning model is statistically trained with the patterns described above, and therefore, becomes capable of predicting the likelihood of the node N or an edge E added from the visual program currently being created.

<Learning Model Storage Unit 7>

The learning model storage unit 7 is a storage device that stores therein data including the architecture, weights, training conditions, and evaluation metrics of the learning model trained by the graph learning unit 6, and a functional unit that stores therein the learning model and provides one of the learning models stored therein, in response to a request from the added node selecting unit 8.

<Added Node Selecting Unit 8>

The added node selecting unit 8 is a functional unit that makes a recommendation of a candidate of a node to be added, to the visual programming unit 2. Specifically, in response to a recommendation request from the visual programming unit 2, the added node selecting unit 8 receives information of the visual program currently being created by the visual programming unit 2; inputs the information of the visual program currently being created to the feature calculating unit 5; and causes the feature calculating unit 5 to calculate the features F corresponding thereto; acquires a learning model stored in the learning model storage unit 7; creates a ranking of candidate nodes N and edges E to be added to the visual program currently being created, the candidates being those to be presented to the user by the visual programming unit 2, by sorting by likelihood, based on the likelihoods of the respective nodes N and edges E obtained by inputting the calculated features F to the learning model; transmits the ranking to the visual programming unit 2, and causes the visual programming unit 2 to present the ranking on the user interface generated by the visual programming unit 2.

For example, when the user performs an operation of adding a node to a visual program while creating the visual program in the visual programming unit 2, the visual program currently being created is transmitted to the added node selecting unit 8, and the added node selecting unit 8 responds to the visual programming unit 2 by transmitting the ranking of candidates of nodes N and edges E to be added. The raking of the candidates of the nodes to be added is then presented to the user, or the node N or the edge E having a highest likelihood is automatically added.

<Example of GUI of Visual Programming Unit 2>

Figure 2:
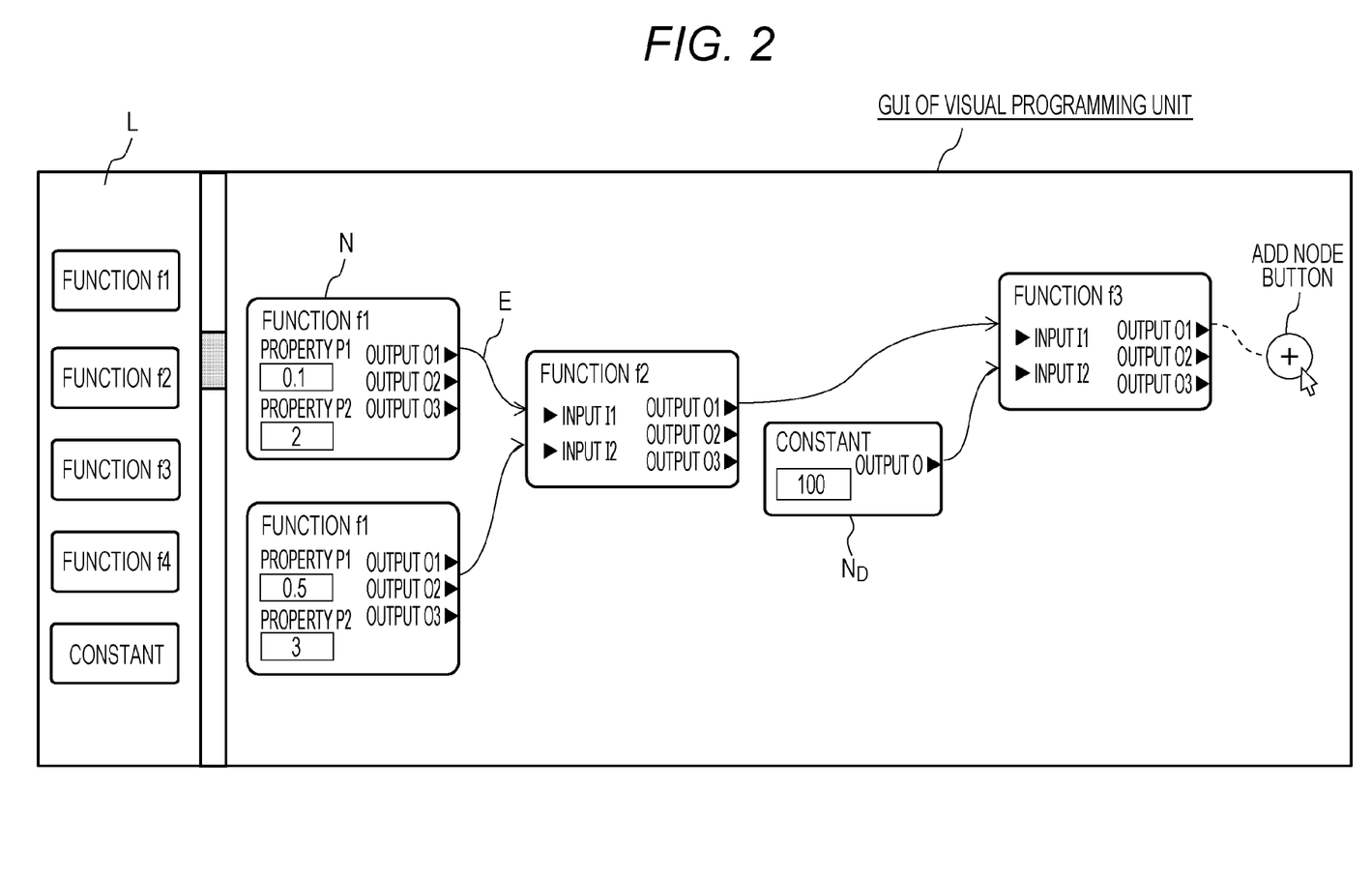
FIG. 2 is an illustration showing an example of a graphical user interface (GUI) of a visual programming unit.

FIG. 2 shows an example of a GUI of the visual programming unit 2. A list L of nodes N is presented on the left side in FIG. 2, and a visual program being created by a user making operations on the user terminal 1 is shown on the right side.

As shown in this drawing, the visual program having been created includes a plurality of nodes N each of which defines data and processing, and the nodes are connected with directed edges E. For example, an edge E connects an output O1 of a node N representing a function f1 on the top, to an input I1 of a node N representing a function f2. In the same manner, another edge E connects the output O1 of the node N representing the function f1 on the bottom, to an input I2 of the node N representing the function f2. Note that, hereinafter, a point (an output O or an input I of a node N) to which the edge E can be connected will be referred to as a "handle".

In addition to connecting nodes N with an edge E, a value of a property P representing data or processing may be sometimes defined to a node N. Furthermore, there are some nodes N other than functions with an input and output, and one example of such nodes is a node ND representing a data structure, such as a constant or a structure. There are also some other nodes N defining the order and the sequence of processing, such as conditional branching and a loop. A user creates a visual program by adding a node N or an edge E by pressing Add button, or by deleting, editing (by changing a parameter), or moving a node N or an edge E by making operations on the user terminal 1.

The nodes N representing processing such as functions, constants, and branches, which are the components of a visual program, are predefined, and the user can select desirable one from the list L of nodes N presented on the left side of the GUI in FIG. 2. Definition information for nodes N, such as the function f1 and or the function f2, is predefined in the visual programming unit 2. Examples of the definition information include types of the name of properties P that can be defined to the node N, and the presence of the definition of a handle to which an edge E can be connected.

<Example of Visual Program Data>

Figure 3A:
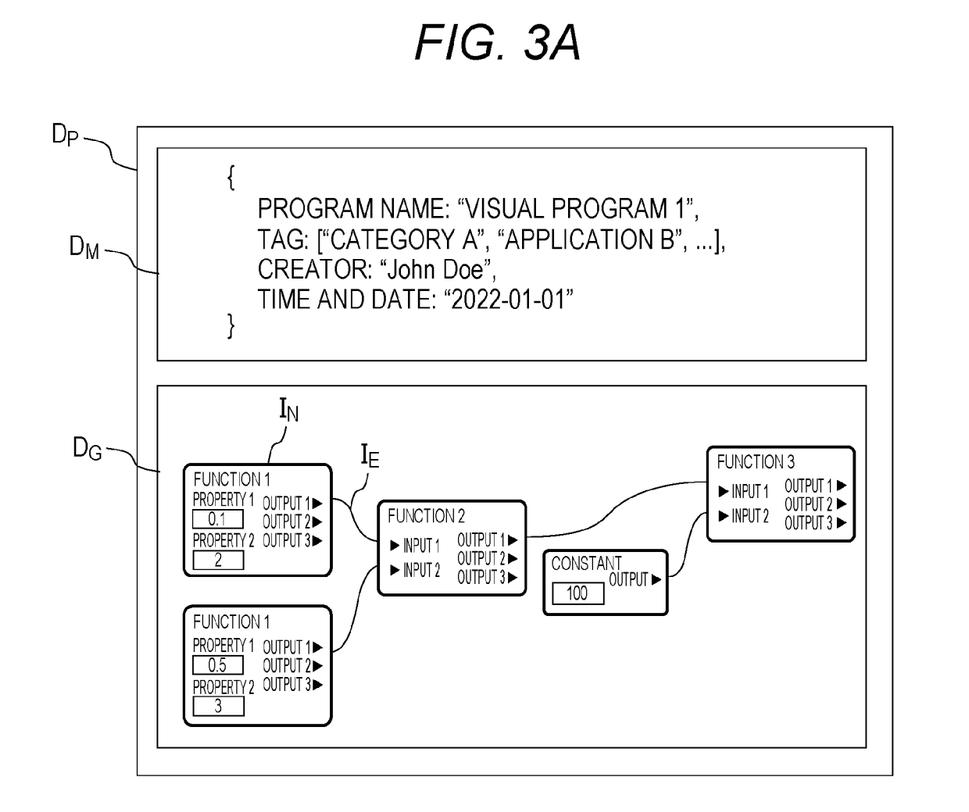
FIG. 3A is an illustration showing an example of visual program data.

FIG. 3A is an example of visual program data $D_P$. The visual program data $D_P$ includes metadata $D_M$ of the visual program and graph data DG of the visual program, with the graph data DG defined as a directed graph.

FIG. 3A shows an example in which the metadata $D_M$ is described in JavaScript (registered trademark) Object Notation (JSON). However, a format such as a hierarchical data structure described in xml or binary may also be used as a format for saving the metadata $D_M$. As shown in the illustration, the metadata $D_M$ contains information including character strings representing a program name, a creator, and a saved date, and tag information including a plurality of keyword character strings.

Figure 3B:
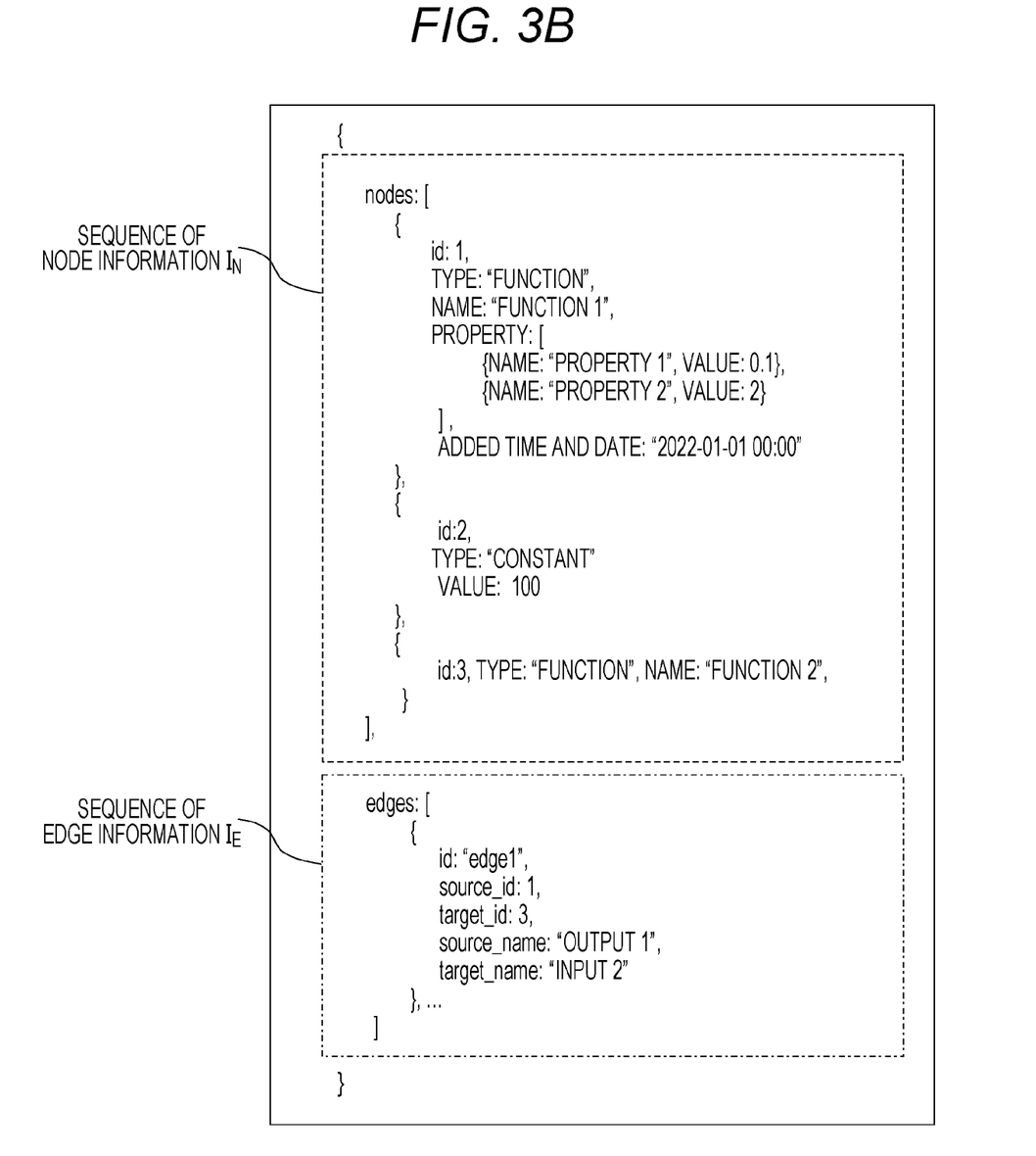
FIG. 3B is an illustration showing an example a representation of a visual program in JavaScript Object Notation (JSON) format.

The graph data DG of the visual program stores therein node information IN and edge information IE by which the visual program created by the visual programming unit 2 can be reproduced. FIG. 3B shows an example in which the graph data DG is described in the JSON format mentioned above. In FIG. 3B, the graph data DG of the visual program is expressed in a manner separated into a sequence of node information IN and a sequence of edge information IE.

The sequence of the node information IN described inside of the broken line includes information such as the identifier of a node N, a node type string representing the type of the node N, such as data, function, and conditional branch, a name string representing the name of the function or the like, a name and an input value of a property P that can be directly input to the node N by a user, and the time and date on and at which the node N is added.

The sequence of the edge information IE described inside of the alternate long and short dash line defines information including an edge identifier, identifiers of the source node and the target node N of the edge, and the handle names in the source node and the target node N of the edge E.

<Processing Sequence of Training Data Generating Unit 4>

Figure 4:
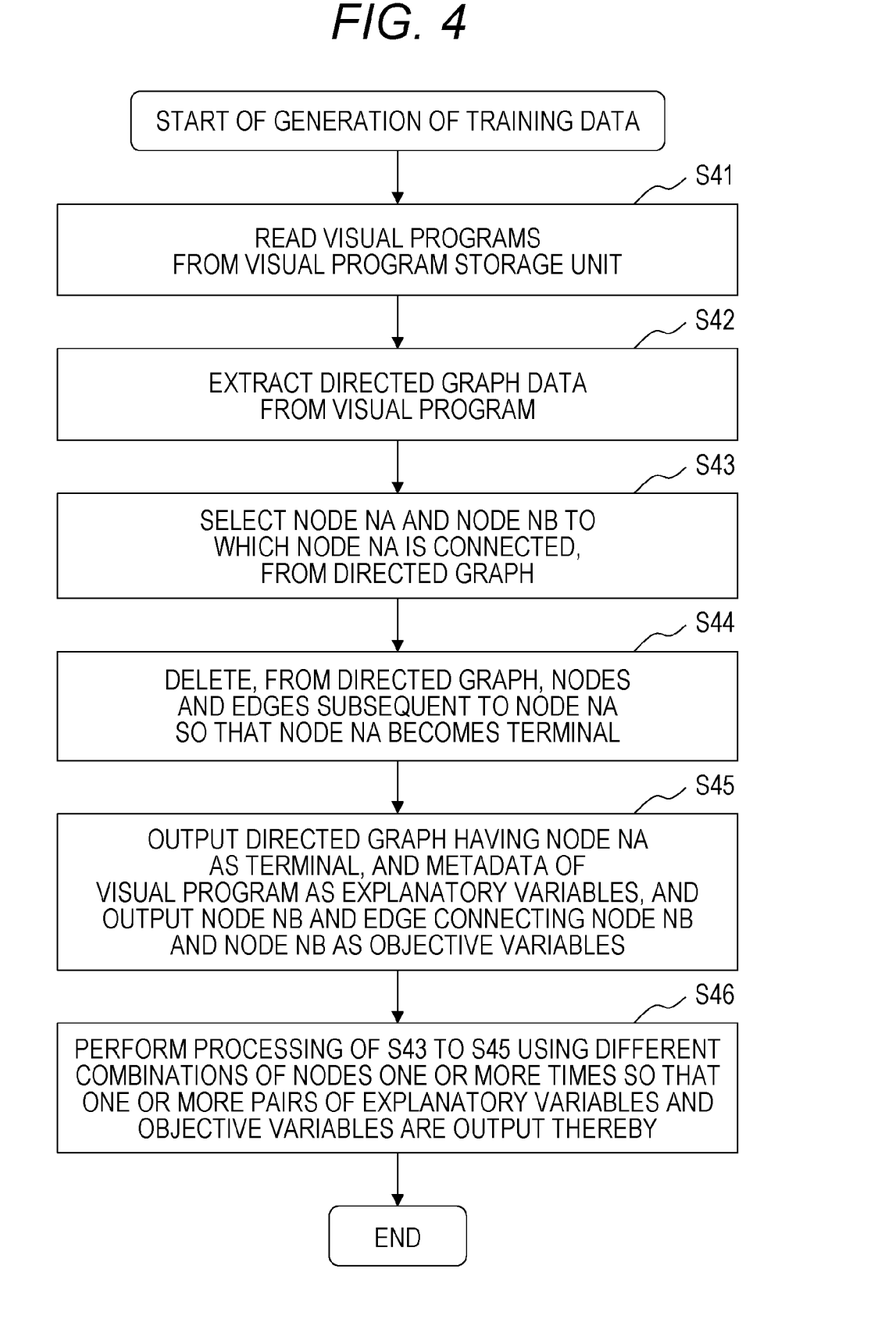
FIG. 4 is an illustration showing an example of a processing sequence of a training data generating unit.

FIG. 4 is an example of a processing sequence of the training data generating unit 4. When a training data generating process is started, to begin with, the training data generating unit 4 reads the visual programs stored in the visual program storage unit 3 in step S41. The training data generating unit 4 reads all of the visual programs, or filters the visual programs using data such as a creation date or tag information included in the metadata $D_M$ and reads the resultant programs. The following processing is then performed to each of the plurality of read visual programs.

In step S42, the training data generating unit 4 extracts directed graph data describing the computer program, from the data of the read visual program.

In step S43, the training data generating unit 4 selects a pair of a node NA and a target node NB to which the node NA is connected, from the directed graph data corresponding to the visual program. Possible methods for selecting the node include a method of randomly selecting a node NA and a node NB, and a method for selecting a node NA and a node NB using the metadata $D_M$ of the visual program or the editing history of the visual program, such as the creation time and date included in the nodes N, e.g., by selecting the nodes NA and NB when the node NB has been added immediately after the creation of the node NA.

In step S44, the training data generating unit 4 creates a sub graph from the directed graph of the visual program, by deleting nodes N and edges E in such a manner that the node NA becomes a terminal node (so that there are no node having the node NA as a source node). Possible methods for deleting nodes N and edges E include a method for using the editing history and deleting the nodes N and the edges E created subsequently to the creation of the node NA, a method for deleting the minimum number of nodes N and edges E to make the node NA a terminal node, or a method of randomly deleting the nodes N and the edges E to make the node NA a terminal node.

In step S45, the training data generating unit 4 defines the sub graph described above, the information of the node NA used as the reference in creating the sub graph, and the metadata $D_M$ of the visual program, as explanatory variables. The training data generating unit 4 also defines the information of the node NB and the edge E between the node NB and the node NA, as the objective variables. The defined explanatory variables and objective variables are then output to the feature calculating unit 5.

In step S46, the training data generating unit 4 performs the processing in steps S43 to S45 one or more times for each of the visual programs, by selecting different nodes NA and NB. As a result of the processing, the training data generating unit 4 obtains one or more pairs of explanatory variables and objective variables for each of the visual programs, and outputs the one or more pairs.

<Processing Sequence of Feature Calculating Unit 5>

Figure 5:
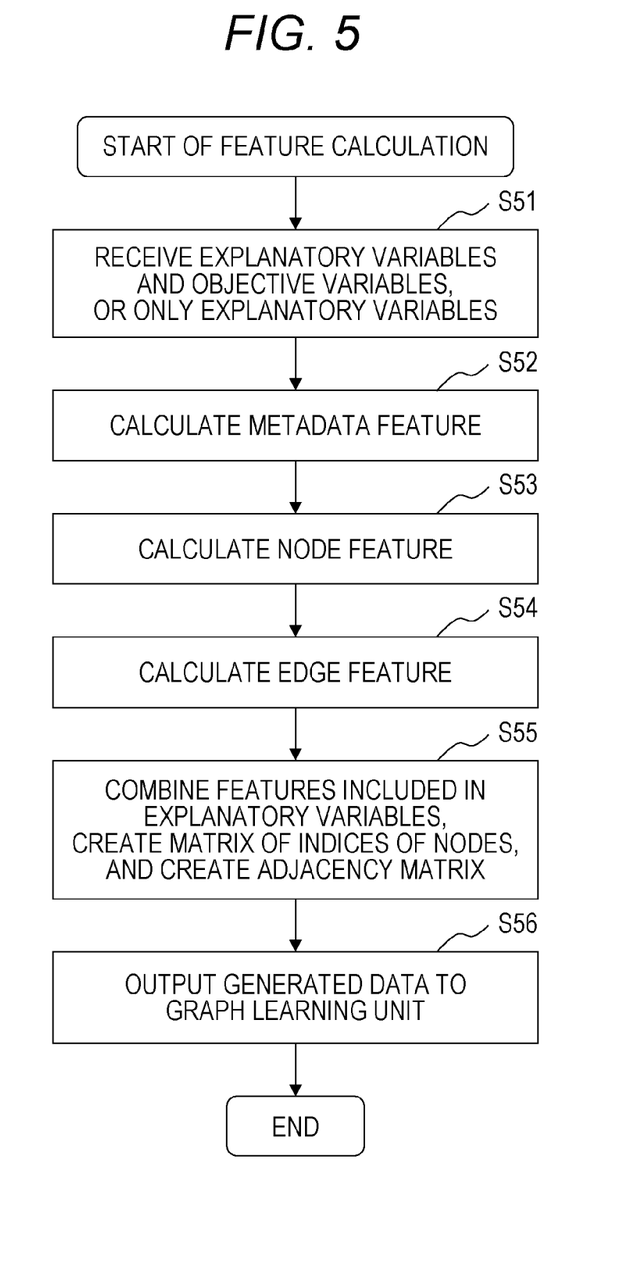
FIG. 5 shows an example of a processing sequence of a feature calculating unit.

FIG. 5 is an example of a processing sequence of the feature calculating unit 5. The feature calculation processing of the feature calculating unit 5 is started in response to a feature calculation request from external, including a request from the training data generating unit 4 or the added node selecting unit 8.

To begin with, in step S51, the feature calculating unit 5 receives the explanatory variable data and the objective variable data from the training data generating unit 4, or receives only the explanatory variables from the added node selecting unit 8. In the latter case, the feature calculating unit 5 performs the following processing only to the explanatory variables. The explanatory variable data includes information of the metadata $D_M$ of the visual program.

In step S52, a metadata feature calculating unit 5a in the feature calculating unit 5 calculates the metadata feature $F_M$. Specifically, the metadata feature calculating unit 5a converts the character string information included in the metadata $D_M$ of the explanatory variable, including the tag information, which is a sequence of the keyword character strings included in the metadata $D_M$, into a numeric vector. In this conversion into a numeric vector, the metadata feature calculating unit 5a applies processing suitable for the language characteristics of the character string information, e.g., separates the character string into tokens, and converts the tokens into a vector, using a method including a language model that uses co-occurrences or deep learning, e.g., word2vec, seq2vec, Transformer, or BERT. The generated vector will be referred to as metadata features $F_M$.

In step S53, a node feature calculating unit 5b in the feature calculating unit 5 calculates node feature data $F_N$.

Specifically, the node feature calculating unit 5b converts quantities of the nodes N included in the directed graph of the visual program in the explanatory variable and the objective variable, into numeric vectors. The quantities include data of the types (e.g., function, constant, conditional branch) and the name (e.g., the name of the function) of a node N, property value data of the node N in the key-value format, and whether the node N is the node NA in the training data generating unit 4. At the time of this conversion, the type or the name of the node N is converted, as a category value, into a vector using a conversion method such as one-hot encoding.

A property value of the node N is converted into a vector using an appropriate conversion method (e.g., numeric vectors, one-hot, or a language model), depending on the data type of the property value (e.g., numeric value, category value, or character string). As described above, after each component of the node N is turned into the expression of a numeric vector, the vector is converted into a feature F having a fixed length, using a merging method such as concatenation, addition, averaging, variance, maximum value, or Attention Multi-Layer Perceptron mechanism. The resultant feature is referred to as a node feature $F_N$.

In step S54, an edge feature calculating unit 5c in the feature calculating unit 5 calculates edge feature data $F_E$. Specifically, the edge feature calculating unit 5c converts the information including the type of the edge E (e.g., an input/output of a function, definition of an execution order, data flow, and the type of data transmitted and received from node N via the edge E), the identifiers of the handle of the target node N and the handle of the source node N, in the directed graph of the visual programs included in the explanatory variable and the objective variable, into numeric vectors. In the conversion into the numeric vectors, the edge type is converted into a numeric vector by the one-hot encoding, and the handle information of the target or the source node N is converted into a numeric vector using a method including feature quantification using one-hot encoding, or a property name language model. The numeric vectors are then converted into a feature F having a fixed length, using a merging method such as concatenation, addition, averaging, variance, maximum value, or Attention Multi-Layer Perceptron mechanism. The resultant feature is referred to as an edge feature $F_E$.

In step S55, under the assumption that the features F are column vectors, the feature calculating unit 5 combines the rows of the plurality of node features $F_N$ and edge features $F_E$ included in the explanatory variables, obtained from the directed graph of the visual program. Furthermore, for each row of the combined edge features $F_E$, the feature calculating unit 5 checks which row of the combined node feature $F_N$ includes the source node N or the target node N of the corresponding edge E, creates a pair of row indices that are integer values of the target node and source node features, and creates a matrix of indices of the nodes N to which the edge E is connected. At this time, using the matrix of the indices of the nodes N, an adjacency matrix of the directed graphs is generated in a sparse or dense data structure, as necessary. Hereinafter, the matrix of indices of the nodes N or the sparse or dense adjacency matrix will be referred to as an adjacency matrix.

Finally, in step S56, the feature calculating unit 5 outputs data including the node features $F_N$, the edge features $F_E$, the graph feature $F_G$, and the adjacency matrix to the graph learning unit 6, for each of the explanatory variables and the objective variables described above.

<Processing Sequence of Graph Learning Unit 6>

Figure 6:
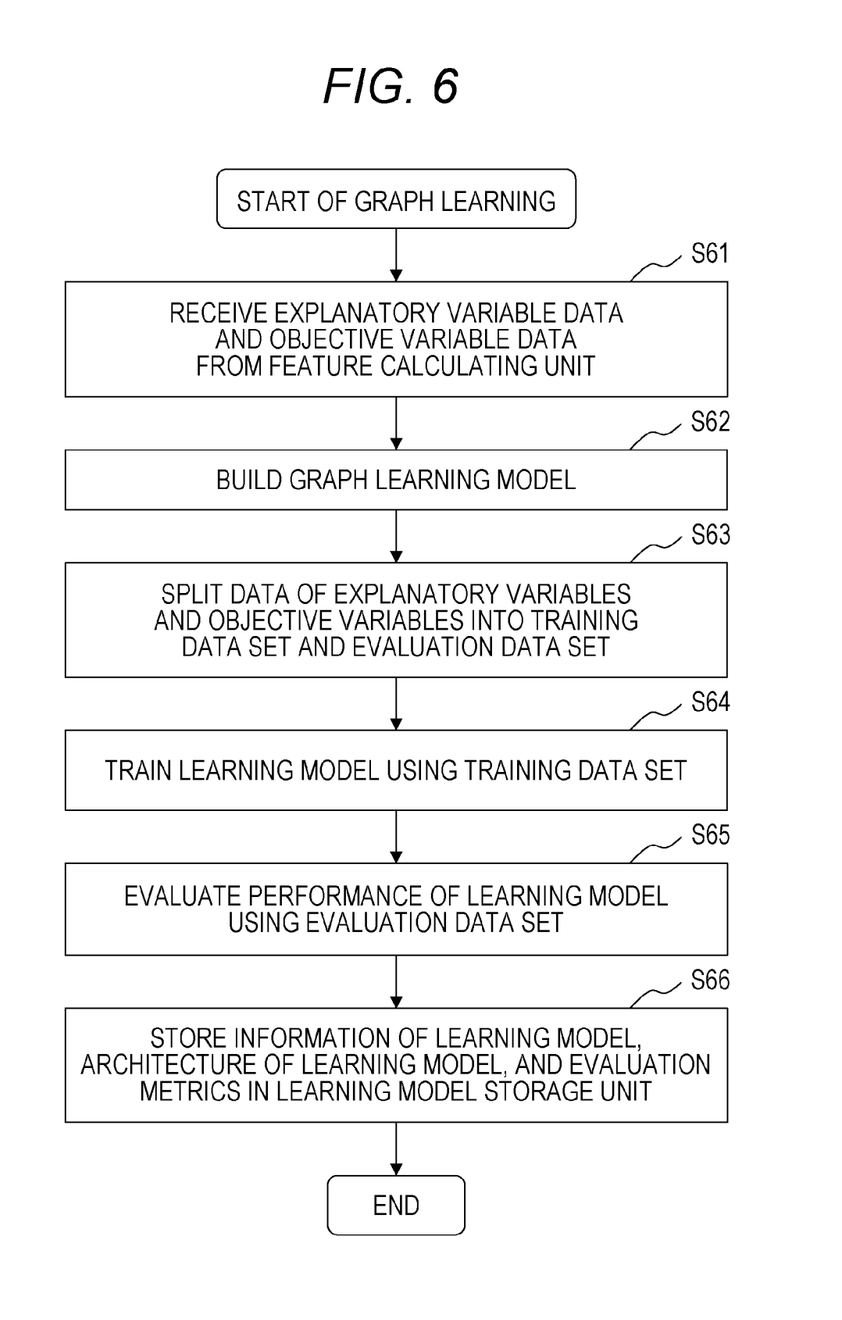
FIG. 6 is an illustration showing an example of a processing sequence of a graph learning unit.

FIG. 6 is an example of a processing sequence of the graph learning unit 6.

To begin with, in step S61, the graph learning unit 6 receives the explanatory variable data and objective variable data having been quantified into the features including the node features $F_N$, the edge features $F_E$, the graph features $F_G$, and the adjacency matrix that are calculated by the feature calculating unit 5.

In step S62, the graph learning unit 6 builds a graph learning model capable of receiving an input of data retaining the directed graph structure information including the node features $F_N$, the edge features $F_E$, and the adjacency matrix, and receiving an input of the graph feature $F_G$ that is feature-quantified metadata $D_M$, simultaneously.

The graph learning model built herein is a multi-modal learning model obtained by combining a learning model that is based on graph learning and that receives the inputs of the node features $F_N$, the edge features $F_E$, and the adjacency matrix, and a learning model that receives vector as inputs, and that receives graph features $F_G$. For the part that is based on graph learning, a graph learning model using a deep learning method such as graph kernel learning, graph convolution learning, message passing, or graph transformer is used.

In addition, for the metadata feature $F_M$, a machine learning method that receives vectors as inputs is used, and examples of such a method include a linear model or multilayer perceptron. The feature calculating unit 5 also combines the output of the learning architecture receiving inputs of the node features $F_N$, the edge features $F_E$, and the adjacency matrix, and the output of the learning architecture receiving inputs of the metadata features $F_M$, to finally build a learning model architecture that outputs a likelihood or a prediction of the type, the name, and the property value of the node N, and the handles of the source and the target of the edge E, which correspond to the objective variables, using a method including multilayer perceptron. Note that it is possible to build a learning architecture that outputs a likelihood or a prediction value only with a learning architecture that uses the node features $F_N$, the edge features $F_E$, and the adjacency matrix as inputs, without using the use of the multi-modal learning.

In step S63, the graph learning unit 6 then splits the data of the explanatory variables and the objective variables, which are the data for training the learning model described above, into a training data set to be used in the training process for optimizing the weights or the like of the learning model, and an evaluation data set for evaluating the performance of the trained learning model. In this step, the graph learning unit 6 splits the data randomly or using a criterion such as the creation time of the visual programs. As the pattern for splitting, one or more data set splitting patterns are generated so as to perform k-fold cross-validation or leave-one-out cross-validation later.

In step S64, the graph learning unit 6 performs the training using the training data set described above. Used in the training in this step as a loss function is a weighted sum of the cross entropy losses and the square errors of the types, the names, and the property values of the nodes N, the handle information of the source and the target of the edge E of the objective functions, and each of the likelihoods or the prediction values predicted by the learning model. The stochastic gradient descent method, for example, is used in the training, with a regularization term or the like added to the loss function, depending on the training method.

In step S65, the graph learning unit 6 then evaluates the performance of the graph learning model trained in step S64, using the evaluation data set prepared in step S63. As an evaluation index, an index including the least-square error, the cross-entropy, AUC, top-N accuracy, or F1-score is used. When a plurality of the data set splitting patterns, such as the k-fold cross-validation, have been defined, in the data set splitting in step S63, an evaluation metrics is calculated and performance is evaluated using the average for each of the splitting patterns in step S65. In some cases, the training (S64) and the evaluation (S65) are repeated in order to tune hyperparameters, including the learning architecture, the learning rate, the batch size, the weight of the loss function, and the like, and to improve the performance using an optimization method such as Bayesian optimization or neural network architecture search.

Finally, in step S65, the graph learning unit 6 outputs and stores the training results including the architecture of the learning model, the learned data such as the weights, the hyperparameters at the time of training, the data, the evaluation metrics, and the creation date of the learned data, to and in the learning model storage unit 7.

<Processing Sequence of Added Node Selecting Unit 8>

Figure 7:
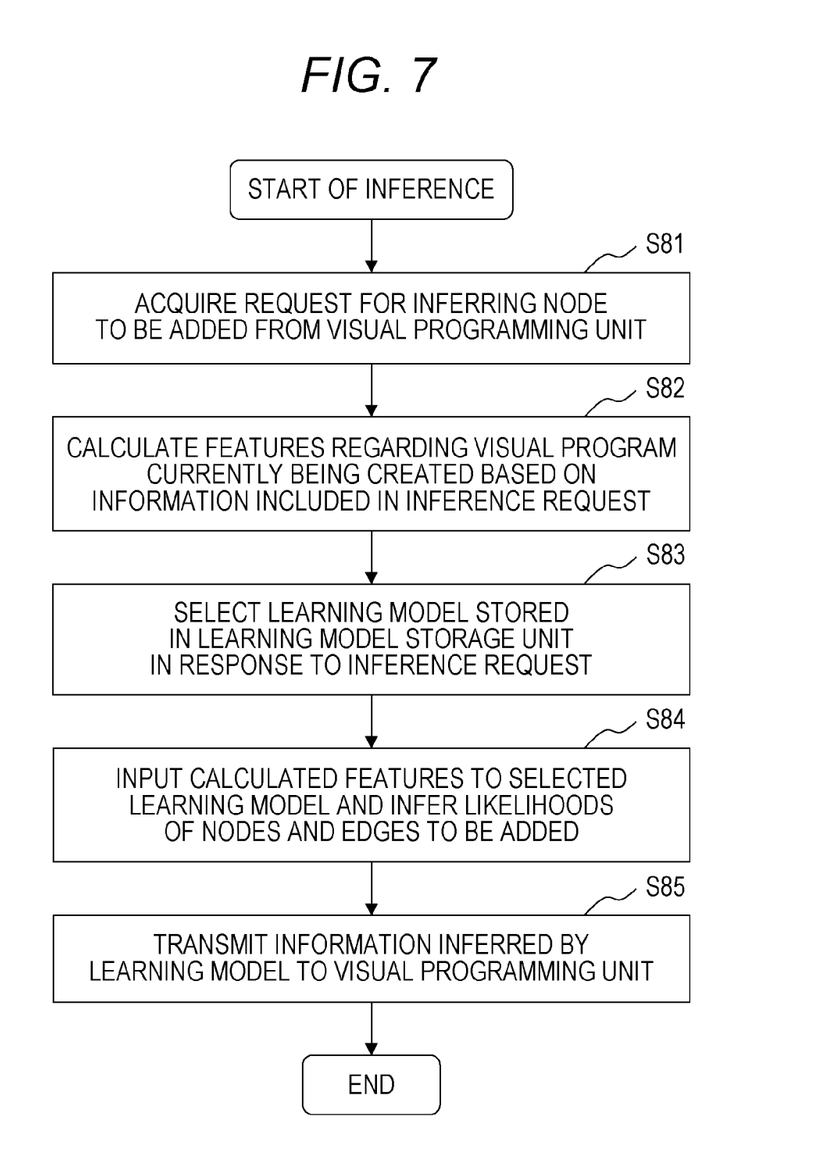
FIG. 7 is an illustration showing an example of a processing sequence of an added node selecting unit.

FIG. 7 is an example of a processing sequence of the added node selecting unit 8.

To begin with, in step S81, the added node selecting unit 8 acquires a request for selecting a node to be added, from the visual programming unit 2. This selection request is a request transmitted from the visual programming unit 2 to the added node selecting unit 8 when the user makes an operation on Add Node button (see FIG. 2) in the visual program GUI, or when the visual programming unit 2 attempts to add a node N automatically, regardless of the user operation.

This selection request is made via a method including an inter-process communication between computer programs, or an application programming interface (API) over a network, and this request includes information of the metadata $D_M$ of the visual program currently being created by the visual programming unit 2 and the directed graph data of the visual program. If available, information of a source node N of the node N to which the visual program is to be added is also included. The information of the node N is handled as the node NA by the feature calculating unit 5.

In step S82, the added node selecting unit 8 outputs data included in the selection request (information regarding the visual program being created by the user) as explanatory variables to the feature calculating unit 5, and causes the feature calculating unit 5 to calculate the numeric vectors of the metadata feature $F_M$, the node features $F_N$, the edge features $F_E$, and the adjacency matrix, pertinent to the visual program currently being created by the user.

Next, in step S83, the added node selecting unit 8 selects and acquires one of the learning models stored in the learning model storage unit 7, in response to the selection request, that is, by considering data including the performance, the creation date, and the learned data.

In step S84, the added node selecting unit 8 inputs the features F calculated in step S82 to the learning model acquired in step S83, and acquires, as outputs, the likelihood and the predictions of the type, the name, and property value of the node N, and the handles of the source and the target of the edge E.

If the selection request acquired in step S81 does not include the information of the node NA (see steps S43 to S45 in FIG. 4), considering each terminal node in the directed graph as the node NA, the features F and the likelihood/prediction values are calculated (S82 and S84, respectively) for each of the terminal nodes, using the same learning model. The added node selecting unit 8 then takes the averages of the outputs from the learning model across all of the cases, to use the likelihood/prediction values.

Finally, in step S85, the added node selecting unit 8 transmits the information such as the likelihoods and the prediction values calculated using the learning model, to the visual programming unit 2. At this time, the added node selecting unit 8 adds semantic information (e.g., the likelihood of the node type, the likelihood of the node name, the source of the edge E, the likelihood of the handle name of the target) represented by the numeric values of the likelihoods or the prediction values to the information of the likelihoods and the prediction values, and outputs and transmits the resultant information to the visual programming unit 2.

<Example of Node Recommendation Screen>

Figure 8:
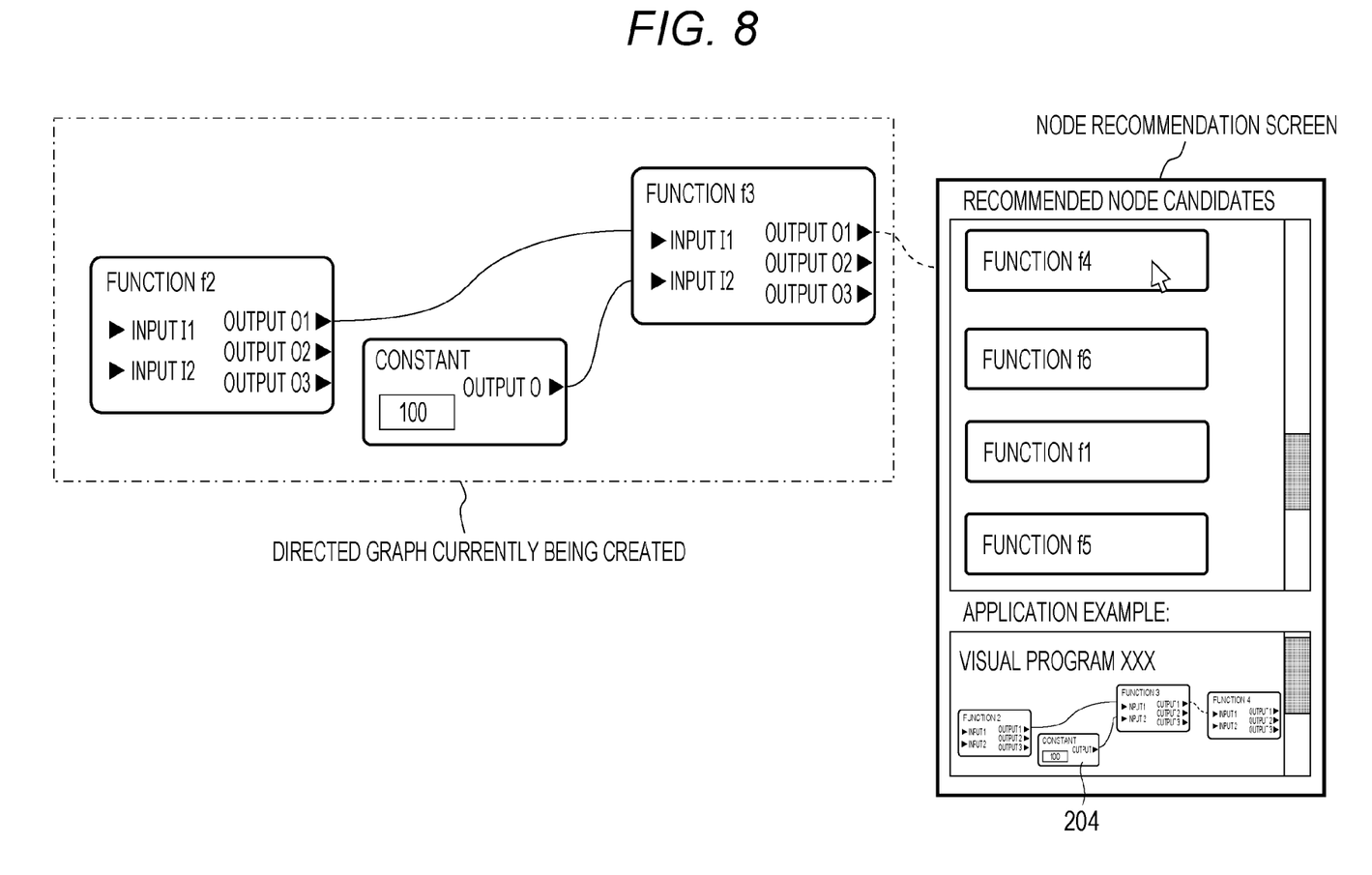
FIG. 8 is an illustration showing an example of recommendation in the visual programming unit using an added node selecting unit.

An example of a recommendation screen, making a recommendation of the node N to be added, presented in the GUI of the visual programming unit 2 when an operation is made on Add Node button in FIG. 2, for example, will be described with reference to FIG. 8. In FIG. 8, for the sake of simplicity, the information presented on the left side of the node corresponding to the function f2 in FIG. 2 is not shown.

When the user attempts to add a new node N downstream of the node of the function f3, by operating the user terminal 1, the visual programming unit 2 transmits a request for selecting a node to be added (specifically, information of the currently created directed graph surrounded by the alternate long and short dash line, the information of the node of the function f3 serving as the source node of the node to be added, if there is any designation of the user, and the information of the metadata $D_M$ of the visual program (FIG. 3A)), to the added node selecting unit 8.

The added node selecting unit 8 executes the processing described in FIG. 7, and acquires information including the likelihood of the node type, the likelihood of the node name, the source of the edge E, and the likelihood of the handle name of the target, as final outputs. Note that, in handling the likelihood information, various types of information are sorted in descending order of the likelihood.

When the visual programming unit 2 receives the output from the added node selecting unit 8, a node recommendation screen is displayed on the downstream side of the directed graph currently being created, which is indicated with the alternate long and short dash line, on the GUI of the visual programming unit 2. The node recommendation screen includes a node recommendation list screen on the top, and an application example screen at the bottom. In the node recommendation list screen, the nodes are listed in descending order of the likelihood. When the user selects a node N to be added from the list screen, or when a node having a likelihood higher than a certain threshold is automatically selected, the node N recommended by the added node selecting unit 8 is added to the downstream of the visual program currently being created. In this manner, the user can easily create a visual program by selecting the recommended nodes one after another. Note that, when a node is added, an edge E or a property P corresponding thereto may also be added automatically, using the information of the predictions of the property information, and the likelihoods and the predictions of the source and target handle information of the edge E, output from the added node selecting unit 8, provided that these likelihoods exceed the threshold.

In the exemplary GUI screen shown FIG. 8, if the visual program resultant of adding each recommended candidate node in the list matches, partially matches, or approximately matches a part near the added node in the directed graph of any of the existing visual programs in the visual program storage unit 3, the visual programs exhibiting a high degree of match are read from the visual program storage unit 3, and one or more visual programs are presented, as an example of how the node N is added.

To determine a match with a visual program stored in the visual program storage unit 3, an algorithm such as a sub graph matching algorithm, approximate sub graph matching, or frequent pattern matching is used to determine the partial match. When a visual program is presented, information including the graph of the visual program around the added node and the metadata $D_M$ of the visual program are presented.

As described above, according to the present embodiment, the following effects can be achieved.

(1) When a user creates a visual program, the user is given a recommendation of a node or an edge to be added, so that the burden of the user in selecting an appropriate node can be alleviated.

(2) With a template substituted with a statistical model trained with data, by collecting the past visual program data, it becomes possible to present patterns of frequently appearing visual programs without the burden of defining and managing the template.

(3) With a greater amount of past data, an optimal node or edge is recommended from a larger number of patterns, so that the performance of the recommendation is improved.

(4) Know-how of the visual program included in the past data is reflected in the recommendations.

Therefore, with the programming aiding apparatus according to the present embodiment, by using the statistical model to train and to collect the templates of the visual program, it is possible to present patterns of the visual programs that appear frequently to a user who is developing an application, without the burden of manually defining and managing the templates, and to improve the efficiency of the application development.

Note that the present disclosure is not limited to the above-explained embodiment, and includes various modifications thereof. For example, the embodiment has been explained above in detail to facilitate understanding of the present disclosure, and the present disclosure is not necessarily limited to the configuration including all of the elements explained above. A part of the configuration according to one embodiment can be replaced with a configuration according to another embodiment, and a configuration according to another embodiment may be added to the configuration of the one embodiment. In addition, another configuration may be added to, deleted from, and replaced with a part of the configuration according to each of the embodiments.

In addition, some or all of the configurations, functions, processing units, means for processing, and the like explained above may be implemented as hardware such as an integrated circuit. Each of the configurations, functions, and the like explained above may be implemented as software by causing a processor to parse and to execute a computer program for implementing the corresponding function. Information such as a program, a table, and a file for implementing each of the functions may be stored in a recording device such as a memory, a hard disk, and a solid state drive (SSD), or a recording medium such as a flash memory card, and a digital versatile disk (DVD).

In each of the embodiments, control lines and information lines presented are those considered to be necessary for the explanation, and are not necessarily the representations of all of the control lines and the information lines in the product. In reality, it is possible to consider that almost all of the configurations are connected to one another.

What is claimed is:

1. A programming aiding apparatus that aids visual programming, the programming aiding apparatus comprising:
   a visual program storage unit that stores therein a visual program created in past;
   a training data generating unit that edits the visual program stored in the visual program storage unit to generate training data including a pair of input data that is input to a learning model and target data, the pair of input data including information of a directed graph of the visual program, and the target data including node features serving as ground truth for training;
   a graph learning unit that trains a graph learning model that receives the feature of a node and a connection of the node in the visual program as an input, among the pair of input data, and outputs a likelihood of the feature of the node to be added to in the visual program; and
   an added node selecting unit that receives the likelihood output by the graph learning unit, and selects a node to be added based on the likelihood.

2. The programming aiding apparatus according to claim 1,
   further comprising a node feature calculating unit that converts node data including a type of the node, a name of the node, and a property value of the node into the feature, wherein
   the node feature calculating unit calculates node feature data from the pair of input data and outputs the node feature data to the graph learning unit, and
   the graph learning unit trains the graph learning model using data including the node feature as an input.

3. The programming aiding apparatus according to claim 1,
   further comprising an edge feature calculating unit that converts data including handle information of a target and a source of an edge, and an edge type into features, the handle information and the edge type being included in data of an edge that connects nodes in the visual program, wherein
   the edge feature calculating unit calculates an edge feature data from the pair of input data, and outputs the edge feature data to the graph learning unit, and
   the graph learning unit trains the graph learning model using data including the edge feature as an input.

4. The programming aiding apparatus according to claim 1,
   further comprising a metadata feature calculating unit that converts metadata including tag information including a name and a sequence of keyword character strings that are associated with the visual program into the feature, wherein
   the metadata feature calculating unit calculates a metadata feature from the pair of input data, and outputs the metadata feature to the graph learning unit, and
   the graph learning unit trains the graph learning model using data including the metadata feature as an input.

5. The programming aiding apparatus according to claim 1, wherein the training data generating unit sets a sub graph of a part of the visual program stored in the visual program storage unit as input data, and sets some of nodes and edges connected to the sub graph as target data.

6. The programming aiding apparatus according to claim 1, wherein the training data generating unit sets the visual program currently being created at a certain point of time as the input data, and sets the node and an edge having been added to the visual program currently being created as the target data, based on a creation history of the visual program stored in the visual program storage unit.

7. A programming aiding method for aiding visual programming, the programming aiding method comprising:
(a) collecting and storing a visual program created in past;
(b) generating training data including a pair of input data that is input to a learning model and target data, the pair of input data including information of a directed graph of the visual program, and the target data including the node features serving as ground truth for training;
(c) training a graph learning model that receives the feature of the node and a connection of the node in the visual program as an input, among the pair of input data, and outputs a likelihood of the feature of the node to be added to in the visual program;
(d) causing the trained graph learning model to calculate, using the graph learning model having been trained, to output the likelihood of the feature of the node, by using data of the visual program currently being created by a user as input data; and
(e) outputting a node to be added based on the likelihood.

8. The programming aiding method according to claim 7, wherein in (d), when the user makes an operation of adding a node to the visual program, the likelihood of the feature of the node is calculated using data of the visual program at the time when the operation is made, as input data.

9. The programming aiding method according to claim 8, further comprising (f) sorting information based on the likelihood calculated by the graph learning model, selecting one or more nodes having a high likelihood that is higher than a threshold value, and presenting the one or more nodes having the high likelihood to the user as candidates as the node to be added.

10. The programming aiding method according to claim 9, wherein in (f), a degree of match between the directed graph of the visual program resultant of adding a presented candidate node to the visual program and the visual program created in past is calculated, and when there is a past visual program matching by a degree higher a threshold, one or more matched visual programs are presented to a user.

* * * * *